(12) United States Patent
Nedez et al.

(10) Patent No.: US 7,988,943 B2
(45) Date of Patent: Aug. 2, 2011

(54) TREATMENTS OF TAIL GAS FROM A CLAUS UNIT OVER AN OPTIMIZED SEQUENCE OF CATALYSTS

(75) Inventors: Christophe Nedez, Salindres (FR); Eric Roisin, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

(21) Appl. No.: 12/740,408

(22) PCT Filed: Oct. 29, 2008

(86) PCT No.: PCT/FR2008/001524
§ 371 (c)(1),
(2), (4) Date: Apr. 29, 2010

(87) PCT Pub. No.: WO2009/095548
PCT Pub. Date: Aug. 6, 2006

(65) Prior Publication Data
US 2010/0284879 A1    Nov. 11, 2010

(30) Foreign Application Priority Data

Oct. 31, 2007   (FR) ..................................... 07 07705

(51) Int. Cl.
*C01B 17/16* (2006.01)
(52) U.S. Cl. ........................................ 423/564
(58) Field of Classification Search ................. 423/564
See application file for complete search history.

(56) References Cited

U.S. PATENT DOCUMENTS

| 4,399,112 A | 8/1983 | Voirin |
| 4,532,119 A * | 7/1985 | Dupin ........................ 423/230 |
| 5,106,607 A * | 4/1992 | Chopin et al. ............... 423/564 |
| 2008/0279759 A1* | 11/2008 | Van Den Brand et al. .... 423/564 |
| 2009/0004070 A1 | 1/2009 | Chow et al. |

FOREIGN PATENT DOCUMENTS

| EP | 1 442 781 A1 | 8/2004 |
| FR | 2 481 254 A | 10/1981 |
| WO | WO 94/11105 A1 | 5/1994 |
| WO | WO 98/07502 A1 | 2/1998 |
| WO | WO 2005/113429 A1 | 12/2005 |

OTHER PUBLICATIONS

International Search Report of PCT/FR2008/001524 (Jun. 19, 2009).

* cited by examiner

*Primary Examiner* — Timothy C Vanoy
(74) *Attorney, Agent, or Firm* — Millen, White, Zelano & Branigan, P.C.

(57) ABSTRACT

For conversion of sulphur-containing compounds present in a gas comprising $H_2S$ and sulphur-containing compounds into additional $H_2S$, a step A of contacting the gas with a reducing gas and a hydrogenation catalyst comprising cobalt, molybdenum and an alumina support, the sum of cobalt and molybdenum, in the oxide form, being 3% to 25% by weight, the surface area of alumina being more than 140 $m^2$/g. In step B, effluent gas from step A is contacted with a catalyst comprising at least one alkaline-earth element, at least one dopant being iron, cobalt or molybdenum and at least one compound of titanium oxide and/or zirconium oxide, the catalyst for step B) being either in bulk or supported.

15 Claims, No Drawings

TREATMENTS OF TAIL GAS FROM A CLAUS UNIT OVER AN OPTIMIZED SEQUENCE OF CATALYSTS

Several processes for transforming $H_2S$ into sulphur exist; the most conventional is termed the modified Claus process.

After amine separation, the gas, denoted "acid" gas, which includes $H_2S$, is sent to a furnace which usually functions at about 1100° C.

A makeup of air can partially oxidize the $H_2S$ present into $SO_2$, so as to obtain a molar ratio of $H_2S$ to $SO_2$ of 2 at the outlet from that thermal step.

After that step, approximately 70% of the sulphur-containing compounds are transformed into elemental sulphur which is recovered by condensation.

On leaving that step, the gases are sent, after re-heating, to catalytic reactors (usually two or three) placed in series which are intended to carry out the Claus reaction (1) but also the COS (2) and $CS_2$ (3) hydrolysis reactions, these impurities already being present:

$$2H_2S+SO_2 \rightarrow 2H_2O+3/xS_x \qquad (1)$$

$$COS+H_2O \rightarrow CO_2+H_2S \qquad (2)$$

$$CS_2+2H_2O \rightarrow CO_2+2H_2S \qquad (3)$$

Any insufficiency of conversion results in a reduction in the sulphur recovery yield and thus to an increase in downstream atmospheric emissions.

In the ease of the conventional modified Claus process, the gases leaving the catalytic step are always incinerated to $SO_2$ which is then discharged to the atmosphere.

In order to reduce noxious atmospheric emissions, a plethora of downstream processes, termed tail gas treatments, have been developed over the past forty years. Most of them require, at the outlet from the catalytic Claus step, reduction of all of the sulphur-containing gases to $H_2S$ before either carrying out direct oxidation of the $H_2S$ to sulphur (4) (below or above the dew point of sulphur) or recycling the $H_2S$ formed to the upstream furnace. The sulphur recovery yield is thus considerably improved and emissions of sulphur-containing compounds to the atmosphere are reduced.

$$H_2S+\tfrac{1}{2}O_2 \rightarrow H_2O+1/xS_x \qquad (4)$$

The sulphur-containing compounds are normally hydrogenated over a heterogeneous catalyst which in the majority of cases functions at a temperature in the range 200° C. (for the best catalysts) to 300° C. (for the less active catalysts). More precisely, the catalyst can allow hydrogenation and/or hydrolysis of all of the sulphur-containing compounds present (including traces of sulphur vapour) into $H_2S$. In practice, deactivation of the catalyst is compensated for by raising the temperature of the reactor. However, that rise in temperature accelerates ageing of the catalyst.

The catalysts used are usually supported CoMo catalysts.

The gases leaving the Claus process are heated to the reaction temperature in an in-line burner.

The reducing gases ($H_2$, CO) necessary for the reactions are naturally present in the stream.

The decline in the activity of the hydrogenation catalyst means a loss of efficiency in the use of reducing gases, a drop in CO conversion and an increase in COS formation.

COS may derive from the Claus process, but may also be formed at the inlet to the reactor by reaction between CO and $H_2S$ via reaction (5):

$$H_2S+CO \rightarrow H_2+COS \qquad (5)$$

Thus, the concentration of COS may increase from the inlet to the hydrogenation reactor, up to the level corresponding to that which may result from this $H_2S$ shift conversion or even other side reactions.

The reactions which are thus engaged may be purely hydrogenation reactions:

$$SO_2+3H_2 \rightarrow 2H_2O+H_2S$$

$$S_x+H_2 \rightarrow H_2S$$

$$CS_2+2H_2 \rightarrow CH_4+H_2S$$

$$COS+3H_2 \rightarrow CH_3SH+H_2O$$

$$CH_3SH+H_2 \rightarrow CH_4+H_2S$$

or hydrolysis reactions:

$$COS+H_2O \rightarrow CO_2+H_2S$$

$$CS_2+2H_2O \rightarrow CO_2+2H_2S$$

or reactions which convert carbon monoxide using water or $H_2S$:

$$H_2O+CO \rightarrow H_2+CO_2$$

$$H_2S+CO \rightarrow H_2+COS$$

These shift conversion reactions are the keys to the operation of a hydrogenation catalyst. A drop in activity results in a lower transformation of CO to $H_2$, and thus in an increase in the concentration of CO and a rise in the quantity of COS (because of the increased conversion of CO with $H_2S$). Thus, a loss of activity causes an increase in the quantity of COS.

PRIOR ART

Patent application WO-98/07502 discloses a sequence of catalysts. The hydrogenation catalyst is supported on silica-alumina and doped with metals from groups VI and/or VIII. The hydrolysis catalyst includes alumina or titanium oxide optionally doped with zirconium or cerium oxide, alkali metal oxides or hydroxides, or rare earth oxides or hydroxides.

SUMMARY OF THE INVENTION

The invention concerns a process for conversion of sulphur-containing compounds present in a gas comprising $H_2S$ and sulphur-containing compounds into $H_2S$. This process comprises a step A for bringing said gas into contact with a reducing gas in the presence of a hydrogenation catalyst comprising at least cobalt, molybdenum and an alumina support, the sum of the quantities of cobalt and molybdenum, calculated in the oxide form, being in the range 3% to 25% by weight, the surface area of said alumina being more than 140 $m^2/g$. It then includes a step B for bringing at least a fraction of the effluent gas from step A into contact with a catalyst comprising at least one compound selected from the group constituted by titanium oxide and zirconium oxide and at least one alkaline-earth, said titanium and/or zirconium oxides corresponding to more than 5% by weight of the catalyst, said catalyst for step B) being either in the form of a bulk oxide comprising only said oxides or in the form of a supported oxide, the total quantity by weight of alkaline-earths being in the range 0.5% to 60% by weight.

DETAILED DESCRIPTION OF THE INVENTION

In the remainder of the text, the groups for the chemical elements are given using the CAS classification described in the CRC Handbook of Chemistry and Physics, published by CRC Press, Editor-in-chief D R Lide, 81$^{st}$ edition, 2000-2001.

The invention concerns a process for conversion of sulphur-containing compounds present in a gas comprising $H_2S$ and sulphur-containing compounds into $H_2S$, said process comprising the following steps:

a) a step A for bringing said gas into contact with a reducing gas, preferably $H_2$ and/or CO, in the presence of a hydrogenation catalyst comprising at least cobalt, molybdenum and an alumina support, the sum of the quantities of cobalt and molybdenum, calculated in the oxide form, being in the range 3% to 25% by weight, preferably in the range 6% to 20% by weight, the surface area of said alumina being more than 140 m$^2$/g, preferably more than 180 m$^2$/g, more preferably in the range 190 to 340 m$^2$/g;

b) a step B for bringing at least a fraction of the effluent gas from step A into contact with a catalyst comprising at least one compound selected from the group constituted by titanium oxide and zirconium oxide and at least one alkaline-earth, preferably calcium, said oxides of titanium and/or zirconium corresponding to more than 5% by weight of the catalyst, said catalyst for step B) being either in the form of a bulk oxide comprising only said oxides or in the form of a supported oxide, the total quantity by weight of alkaline-earth being in the range 0.5% to 60% by weight, preferably in the range 1% to 50% by weight, advantageously in the range 2% to 35% by weight.

The gas comprising $H_2S$ and the sulphur-containing compounds sent to step A) generally has a $H_2S$ content of less than 3% molar, a $SO_2$ content of less than 2% molar and a sum of the quantities of all of the other sulphur-containing compounds of less than 1% molar. Preferably, these quantities are respectively less than 2%, 1.5% and 1% molar. More preferably, these quantities are respectively less than 1.5%, 1% and 0.7% molar.

The fraction of the effluent gas from step A) sent to step B) generally has a $H_2S/SO_2$ molar ratio of less than 5.

The oxides of titanium and/or zirconium may optionally be supported on alumina.

The catalyst for step B) may comprise at least titanium oxide and at least one alkaline-earth.

Further, it may comprise at least one dopant s elected from the group constituted by elements from group VIIIB and VIB, the total quantity by weight of dopants being in the range 0.5% to 50%, preferably in the range 1% to 30%, more preferably in the range 1% to 15%. The dopant is generally selected from the group constituted by iron, cobalt and molybdenum, preferably from the group constituted by cobalt and molybdenum.

The present invention concerns a sequence of catalysts which leads to improved yields under iso-experimental conditions for $H_2S$ transformation.

The concept in this portion dedicated to hydrogenation is to arrive at a better conversion, in particular of COS, but also of $CS_2$, without having to increase the temperature of the reaction, which would involve a higher energy consumption.

The invention thus consists of using a sequence of at least two catalysts, placed in the same catalytic reactor or in a plurality of catalytic reactors disposed in series which can successively:

a) during step A, intensify the sulphur-containing compound hydrogenation reactions;

b) during step B, improve the conversions of certain difficult compounds, in particular COS and $CS_2$.

The catalyst for step B may be in any known form, for example in the form of a powder, bead, extrudate, monolith or crushed form, preferably in the form of a cylindrical or polylobed extrudate or in the form of beads.

In a variation in which titanium oxide is present on the catalyst for step B), a sulphate of calcium, barium, strontium or magnesium, preferably a sulphate of calcium, is added to the catalyst for step B).

In the case of forming the catalyst for step B) by mixing followed by extrusion, the cross-section of the extrudate is generally in the range 0.5 to 8 mm, preferably in the range 0.8 to 5 mm.

In order to prepare the catalyst for step B), the elements and any dopants are deposited using any method which is known to the skilled person. As an example, impregnation of the support, already prepared with the elements to be added or precursors of said elements, may be carried out. Mixing the elements or precursors of said elements with the support during or after forming thereof may also be carried out. The dopants may also be deposited into the support by co-precipitation.

In the case of deposition by impregnation, this is carried out in known manner by bringing the support into contact with one or more solutions, one or more sols and/or one or more gels comprising at least one element in the form of an oxide or salt or one of their precursors. The operation is generally carried out by immersing the support in a predetermined volume of solution of at least one precursor of at least one dopant.

In accordance with a preferred mode, the dopant elements are added by depositing using dry impregnation.

In accordance with an alternative mode, excess impregnation is carried out. The excess solution is then evacuated by draining.

Steps A and B are generally carried out at a temperature in the range 50° C. to 350° C., preferably in the range 100° C. to 330° C., preferably in the range 130° C. to 310° C., and more preferably in the range 170° C. to 300° C.

The HSV is generally comprised between 300 and 5000 preferably between 500 and 4000 h$^{-1}$, more preferably between 1000 and 3500 h$^{-1}$. The pressure is generally less than 0.5 MPa, more preferably less than 0.2 MPa.

EXAMPLES

Catalyst A

CoMo

Catalyst A corresponded to catalyst TG 107 sold by Axens. It was a fresh catalyst based on cobalt and molybdenum on alumina.

Its specific surface area was 223 m$^2$/g and its total pore volume was 46.2 ml/100 g.

Catalyst B

CoMo

Catalyst B corresponded to TG 107 which had been aged by using it industrially in a reactor for one year. Its specific surface area was 147 m$^2$/g and its total pore volume was 42.1 ml/100 g.

It was contaminated with 0.7% of carbon and 9% of sulphur.

Catalyst C

TiO$_2$Ca

A suspension of lime was added to a suspension of titanium oxide obtained by hydrolysis and filtration using a conventional ilmenite sulphuric attack procedure, in order to neutralize all of the sulphates present.

When complete, the suspension was dried at 150° C. for one hour. The powder was then kneaded in the presence of water and nitric acid. The paste generated was extruded through a die to obtain extrudates with a cylindrical form.

After drying at 120° C. and calcining at 450° C., the extrudates had a diameter of 3.5 mm, with a specific surface area of 116 m$^2$/g for a total pore volume of 36 ml/100 g.

The TiO$_2$ content was 88% with a CaSO$_4$ content of 11%, the loss on ignition providing the balance to 100%.

Catalyst D

TiO$_2$CaFe

Catalyst D resulted from dry impregnating an aqueous acidic iron sulphate solution onto C, followed by drying at 120° C. and calcining at 350° C.

The iron content (expressed as Fe$_2$O$_3$) was 2.5%.

Catalyst E

TiO$_2$CaCoMo

Catalyst E resulted from dry impregnating a solution of cobalt nitrate and ammonium heptamolybdate onto C, followed by drying at 120° C. and calcining at 450° C.

The quantities by weight of cobalt and molybdenum (expressed as CoO and MoO$_3$) were respectively 3.1% and 13.9%.

Catalyst F

TiO$_2$ Impregnation

Catalyst F was obtained by dry impregnation of CR-3S Claus alumina, sold by Axens, with titanium oxychloride in order to produce, after calcining at 500° C., a quantity of 5% of TiO$_2$ and a specific surface area of 267 m$^2$/g.

Catalyst G

TiO$_2$ Coagulation

Catalyst G was obtained by co-granulation of flash alumina and titanium gel to produce, after calcining at 450° C., beads with a granulometry in the range 3.15 to 6.3 mm exhibiting a 27% TiO$_2$ content and a specific surface area of 281 m$^2$/g.

Catalyst H

ZrO$_2$ Impregnation

Catalyst H was prepared by dry impregnation of CR-3S Claus alumina, sold by Axens, with zirconium acetate to obtain, after calcining at 500° C., a 3% ZrO$_2$ content and a specific surface area of 287 m$^2$/g.

Catalyst I

TiO$_2$K

I corresponded to a pure TiO$_2$ catalyst modified by adding potassium by dry impregnation such that its final content was 1.7% of K$_2$O.

Catalyst J

NiMo 1.6 mm diameter extrudates of an amorphous silica-alumina comprising 50% alumina were dry impregnated with a solution of nickel nitrate and ammonium heptamolybdate. After drying at 120° C. and calcining at 450° C., the contents by weight of nickel and molybdenum (expressed as NiO and MoO$_3$) were 4.0% and 15% respectively for a specific surface area of 238 m$^2$/g and a total pore volume of 62 ml/100 g.

Catalyst K

CoMo 1.6 mm diameter extrudates of an amorphous silica-alumina comprising 50% alumina were dry impregnated with a solution of cobalt nitrate and ammonium heptamolybdate. After drying at 120° C. and calcining at 450° C., the contents by weight of cobalt and molybdenum (expressed as CoO and MoO$_3$) were 3.0% and 14.1% respectively for a specific surface area of 251 m$^2$/g and a total pore volume of 68 ml/100 g.

Catalytic Results

Comparative catalytic tests were carried out under the following conditions: catalysts A, B, J or K were exposed to a stream of gas containing, by volume, 18% CO$_2$, 0.6% H$_2$S, 500 ppm COS, 0.3% SO$_2$, 1.2% CO, 1.5% H$_2$, 200 ppm CS$_2$, 22% H$_2$O, 800 ppm S$_8$ and optionally, 520 ppm of CH$_3$SH, at an HSV of 2000 h$^{-1}$ and at a temperature of 220° C. or 240° C.

One of catalysts C to I was placed in the same reactor downstream of catalyst A, B, J or K such that the volume of this second catalyst corresponded to one third of the volume of catalyst A, B, J or K.

The catalytic performances, observed at equilibrium, are shown in Tables I and II.

TABLE I

| | Conversions observed at equilibrium, in the absence of methyl mercaptan | | | |
|---|---|---|---|---|
| | Temperature | Conversion, % | | |
| Catalyst(s) | (° C.) | SO$_2$ | COS | CS$_2$ |
| A | 220 | 83 | 70 | 40 |
| A | 240 | 100 | 74 | 83 |
| B | 220 | 67 | −470 | 10 |
| B | 240 | 92 | −410 | 33 |
| B then C | 220 | 85 | −100 | 40 |
| B then C | 240 | 95 | −35 | 55 |
| B then D | 240 | 95 | 5 | 40 |
| B then E | 220 | 98 | 41 | 71 |
| B then I | 220 | 67 | −450 | 17 |
| A then C | 220 | 85 | 86 | 67 |
| A then E | 240 | 100 | 91 | 88 |
| A then F | 240 | 89 | 75 | 51 |

TABLE I-continued

Conversions observed at equilibrium, in the absence of methyl mercaptan

| Catalyst(s) | Temperature (° C.) | Conversion, % | | |
|---|---|---|---|---|
| | | $SO_2$ | COS | $CS_2$ |
| A then G | 240 | 87 | 76 | 49 |
| A then H | 240 | 91 | 79 | 56 |
| A then I | 220 | 83 | 61 | 45 |
| J then C | 220 | 77 | −110 | 37 |
| K then C | 220 | 79 | −24 | 49 |

A negative conversion means that the product concerned was more abundant at the reactor outlet than at the inlet.

The catalytic tests demonstrate that the sequence J then C produces poorer conversions than sequence K then C.

Furthermore, the sequence K then C produced poorer conversions than sequence A then C.

TABLE II

Conversions observed at equilibrium, in the presence of methyl mercaptan

| Catalyst(s) | Temperature (° C.) | Conversion, % | | | |
|---|---|---|---|---|---|
| | | $SO_2$ | COS | $CS_2$ | $CH_3SH$ |
| B | 240 | 97 | −295 | −45 | 87 |
| B then C | 220 | 91 | −45 | −41 | 92 |
| B then C | 240 | 97 | 10 | 5 | 95 |
| B then E | 240 | 100 | 62 | 72 | 100 |

A negative conversion means that the product concerned was more abundant at the reactor outlet than at the inlet.

These catalytic tests demonstrate that sequence B then E produced better conversions than sequence B then C. The effect of the CoMo dopant on the catalyst for step B is thereby demonstrated.

The invention claimed is:

1. A process for the conversion of sulphur-containing compounds present in a gas comprising $H_2S$ and sulphur-containing compounds into $H_2S$, said process comprising the following steps:
   a) a step A for bringing said gas into contact with a reducing gas in the presence of a hydrogenation catalyst comprising at least cobalt, molybdenum and an alumina support, the sum of the quantities of cobalt and molybdenum, calculated in the oxide form, being in the range of 3% to 25% by weight, the surface area of said alumina being more than 140 m$^2$/g;
   b) a step B for bringing at least a fraction of the effluent gas from step A into contact with a catalyst comprising at least one alkaline-earth element, at least one dopant selected from the group of iron, cobalt and molybdenum, and at least one compound selected from the group of titanium oxide and zirconium oxide, said oxides of titanium and/or zirconium corresponding to more than 5% by weight of the catalyst, the total quantity by weight of dopants being in the range of 0.5% to 50%, the total quantity by weight of alkaline-earths elements being in the range of 0.5% to 60% by weight, said catalyst for step B) being either in the form of a bulk oxide comprising only said oxides or in the form of a supported oxide.

2. A conversion process according to claim 1, in which the sum of the quantities of cobalt and molybdenum, calculated in the oxide form, in the catalyst for step A) is in the range 6% to 20% by weight.

3. A conversion process according to claim 1, in which the surface area of the alumina support of the catalyst for step A) is more than 180 m$^2$/g.

4. A conversion process according to claim 1, in which the catalyst for step B) comprises at least one titanium oxide.

5. A conversion process according to claim 1, in which the catalyst for step B) comprises a single alkaline-earth element.

6. A conversion process according to claim 5, in which the alkaline-earth element is calcium.

7. A conversion process according to claim 1, in which said at least one dopant is from the group of cobalt and molybdenum.

8. A conversion process according to claim 1, in which the total quantity by weight of dopant is in the range 1% to 30%.

9. A conversion process according to claim 1, in which said oxides of titanium and/or zirconium are supported on alumina.

10. A conversion process according to claim 1, in which the gas comprising $H_2S$ and sulphur-containing compounds sent to step A) has a $H_2S$ content of less than 3% molar, a $SO_2$ content of less than 2% molar and a sum of the quantities of all of the other sulphur-containing compounds of less than 1% molar.

11. A conversion process according to claim 6, in which the catalyst for step B) comprises at least one titanium oxide.

12. A conversion process according to claim 7, in which the catalyst for step B) comprises at least one titanium oxide.

13. A conversion process according to claim 12, in which the catalyst for step B) comprises a single alkaline-earth element.

14. A conversion process according to claim 13, in which the alkaline-earth element is calcium.

15. A conversion process according to claim 14, in which the gas comprising $H_2S$ and sulphur-containing compounds sent to step A) has a $H_2S$ content of less than 3% molar, a $SO_2$ content of less than 2% molar and a sum of the quantities of all of the other sulphur-containing compounds of less than 1% molar.

* * * * *